Patented Dec. 11, 1951

2,578,518

UNITED STATES PATENT OFFICE 2,578,518

MOLDING COMPOSITION FOR BATTERY CONTAINERS

Charles H. Ditz, Watertown, and Harold A. Hussey, Belmont, Mass., assignors to The B. F. Goodrich Company, New York, N. Y., a corporation of New York No Drawing. Application May 26, 1948, Serial No. 29,417

7 Claims. (Cl. 136—166)

This invention relates to a thermoplastic molding composition suitable for a variety of applications, particularly to such a composition suitable for making storage battery containers, and pertains more specifically to mixtures of polystyrene with copolymers of conjugated diolefins and to storage battery containers molded therefrom.

Polystyrene, either alone or together with the pigments, fillers, and other compounding ingredients commonly used in the rubber and plastics industry, has been widely used for the manufacture of molded objects. However, the physical properties of polystyrene are such that articles molded therefrom have certain inherent disadvantages. It is difficult to remove hollow objects molded of these materials from the mandrel on which they are formed. Furthermore, the finished molded articles exhibit low impact resistance and tend to crack when subjected to changes in temperature.

We have now discovered that compositions comprising a homogeneous mixture of polystyrene with a lesser amount, especially from one-tenth to one-third its weight, of a copolymer of an open-chain conjugated diolefin exhibit unexpectedly superior properties which render them useful for many purposes, particularly in the manufacture of hollow molded articles. We have found that storage battery containers of the type which are provided with internal partitions, and also covers for such containers may advantageously be produced from such compositions and that these containers exhibit remarkably superior properties in service. It has also been found that such compositions are quite valuable as stiffening agents for shoe soles and heels, and for various other applications involving molding.

The diolefin copolymers which may be employed in the composition of our invention include rubbery copolymers of an open-chain conjugated diolefin containing from 4 to 8 carbon atoms with an equal or lesser proportion of copolymerizable monomer containing a single ethylenic unsaturation. The diolefins which are embraced within the scope of this invention include such butadiene-1,3 hydrocarbons as butadiene-1,3, isoprene, 2,3-dimethyl butadiene-1,3 and the like. Among the copolymerizable monomers are styrene, acrylonitrile, isobutylene, methyl acrylate, methyl methacrylate, and the like. Two or more copolymerizable monomers may be employed so long as the diolefin amounts to at least 50% by weight of the total present in the copolymer. Best results have been obtained with copolymers containing from 50 to 90% by weight of copolymerized diolefin, the remainder being copolymerized monomeric material as set forth above. Particularly preferred are copolymers of 50 to 80 parts by weight of butadiene-1,3 with from 20 to 50 parts of styrene or of acrylonitrile.

The polystyrene and the copolymer may be mixed together in the desired proportions by any of the usual methods. For example, the solid materials may be mixed together on a roll mill or in an internal mixer; aqueous dispersions of the materials may be mixed together and then the mixed dispersion coagulated or solutions of the materials in organic solvents may be mixed together and the solvent then removed as by evaporation.

Any of the usual pigments, fillers, dyes, plasticizers, or other compounding ingredients commonly used in the rubber and plastics industry may be employed in the composition of our invention if desired. Vulcanizing agents and accelerators of vulcanization may also be incorporated in order to vulcanize the rubbery diolefin copolymer, but it is preferred, in the manufacture of battery containers, to omit these ingredients in order to provide an unvulcanized permanently thermoplastic composition.

After mixing, the composition may be processed or shaped by conventional methods, e. g., by extruding, molding, or calendering. When the composition is molded, it is preferred to employ the so-called "transfer" molding method, in which a heated plastic mass of the composition is forced through an orifice into a cooled mold where it is held until rigid. If the copolymer portion of the composition is to be vulcanized, of course, means may be provided for heating the mold in order to effect vulcanization.

The following specific examples of the compositions of our invention are given solely for the purpose of illustration; the scope of the invention is not intended to be limited thereby but only as indicated in the appended claims.

Example I

The following composition, in which the parts are by weight, was prepared by mixing the ingredients on a hot roll mill.

| | |
|---|---|
| Polystyrene | 82.5 |
| Copolymer of butadiene-1,3 and styrene (50:50) | 16.5 |
| Zinc stearate | 1.0 |

The zinc stearate acts as a lubricant to facilitate later separation of the composition from the surface of the mold. After thorough mixing, the composition was sheeted out on the mill, cooled to room temperature, then ground to a suitable particle size (e. g., to pass a 10-mesh screen).

The particulate composition was then placed in the heating chamber of a transfer molding apparatus and after heating to about 300° F. was forced through an orifice into a cooled mold to form a conventional battery container having transverse internal partitions. A cover for the container may be formed in the same way. After five to ten minutes in the mold, the composition was cool enough so that it could be removed without deformation.

The acid absorption of the molded container, measured by immersing a two-inch square sample of the container wall in sulfuric acid (sp. gr. 1.30) at a temperature of 150° F. for 28 days, was less than 0.07%. When subjected to the A. S. T. M. Hot and Cold Cycle test (0°–80° F.), the container withstood 100 cycles with no evidence of failure. A container made of polystyrene alone, on the other hand, is capable of withstanding only about 15 to 20 cycles in this test before failure.

Another test commonly employed for evaluating battery containers, known as the "Bulge test," is carried out by maintaining the container filled with sulfuric acid (sp. gr. 1.01) at a temperature of 160° F. for three hours and measuring the change in the overall length and width of the container caused by this treatment. No measurable change could be observed in the battery container described above during this test. On the other hand, containers with equivalent cross-section thicknesses, made of hard rubber, free from polystyrene, generally exhibit an increase in length, or bulge, of 5/64 in. or more, and unless special pains are taken in their manufacture, they frequently require external support to prevent excessive bulge during service.

The molded battery container described above exhibits an Izod impact strength of 0.25 to 0.5 ft. lb. per inch of notch. A similar container made of polystyrene alone exhibits an Izod impact strength only one-tenth as great, ranging from 0.03 to 0.05 ft. lb. per inch of notch.

Example II

The following composition, in which the parts are by weight, was prepared by mixing the ingredients in an internal mixer at a temperature of 300° to 325° F.:

| | |
|---|---|
| Polystyrene | 82.5 |
| Copolymer of butadiene-1,3 with acrylonitrile (55:45) | 16.5 |
| Zinc stearate | 1.0 |

The zinc stearate lubricant is not an essential ingredient of the composition; it may be replaced by calcium stearate or the like, or it may be completely eliminated.

This composition, after mixing, was formed into a battery container by the same procedure as was used in Example I above. The product exhibited an acid absorption of slightly less than 0.15% when a two inch square specimen was heated for 28 days at 150° F. while immersed in sulfuric acid (sp. gr. 1.30). When subjected to the A. S. T. M. Hot and Cold Cycle test and the Bulge test, as described in Example I, the container exhibited substantially the same properties as did the container of Example I. In the Izod impact test, the container of Example II showed a strength of 0.25 to 0.50 ft. lb. per inch of notch.

Example III

An aqueous dispersion of polystyrene was prepared by polymerizing 100 parts of styrene in an aqueous emulsion containing 200 parts of water, 5 parts of soap as emulsifying agent and 0.03 part of potassium persulfate as polymerization catalyst, the polymerization being complete after agitating the emulsion at 50° C. for 48 hours.

In a similar manner an aqueous dispersion of a copolymer of 75 parts of butadiene-1,3 and 25 parts of styrene was prepared by polymerizing a monomer mixture of 75 parts butadiene-1,3 and 25 parts styrene in an aqueous emulsion containing 200 parts of water, 5 parts of soap, 0.03 part of potassium persulfate and 0.5 part of lauryl mercaptan, polymerization being complete after 48 hours at 50° C.

Portions of the two dispersions were then mixed in proportions such that mixed dispersions were prepared containing the two materials in the following ratios:

| | A | B | C |
|---|---|---|---|
| Polystyrene | 80 | 68 | 52 |
| Butadiene-1,3 styrene copolymer (75:25) | 20 | 32 | 48 |

Each of the mixed dispersions was then coagulated by addition of dilute sulfuric acid, and the crumbs of coagulum obtained were kneaded together on a two-roll mixing mill. In each case, a homogeneous mixture was secured.

When these mixtures were employed as stiffeners in shoe soling compositions, excellent results were obtained. For example, compositions were prepared containing the following parts by weight:

| | |
|---|---|
| GR–S (copolymer of 75 parts butadiene-1,3 with 25 parts styrene) | 100.0 |
| Mixture A, B or C above | 30.0 |
| Softener | 20.0 |
| Sulfur | 3.0 |
| Benzothiazyl-2 disulfide | 1.5 |
| Tetramethyl thiuram disulfide | 0.1 |
| Calcium silicate | 40.0 |
| Stearic acid | 5.0 |
| Cotton flock | 15.0 |

These compositions were molded for 15 minutes at 307° F. whereupon they were found to possess a Durometer A hardness of 90 to 95 combined with high resilience, their resilience being markedly superior to that obtained when the mixtures of this invention were replaced by polystyrene or by copolymers of styrene with butadiene-1,3 containing the same total amounts of styrene and butadiene-1,3.

Example IV

The following composition, in which the parts are by weight, was prepared by mixing the ingredients on a hot roll mill:

| | |
|---|---|
| Polystyrene | 90 |
| Copolymer of butadiene-1,3 with acrylonitrile (55:45) | 10 |

After mixing, the composition was formed into a battery container as described in Example I. The product had an acid absorption of 0.066% measured as described in Example II. The results of a "Bulge test" and of a hot and cold cycle test were approximately the same as those for Example I, and the composition exhibited an Izod impact strength of 0.38 ft. lb. per inch of notch.

Example V

The following composition in which the parts are by weight was prepared as described in Example I:

Polystyrene _____ 90
Copolymer of butadiene-1,3 with styrene (50:50) _____ 10

When molded into a battery container and tested as set forth in Examples I and II above, it exhibited the following properties:

Izod impact—0.47 ft. lb. per inch of notch
Bulge test—change too small for measurement
Acid absorption (28 days at 150° F.)—0.072%

Resistance to the hot and cold cycle test was approximately the same as that of Example I.

Example VI

The following composition in which the parts are by weight was prepared as described in Example I:

Polystyrene _____ 75
Copolymer of butadiene-1,3 with styrene (50:50) _____ 25

When subjected to the tests described in Examples I and II above, the following results were obtained:

Izod impact—0.50 ft. lb. per inch of notch
Bulge test—change too small for measurement
Acid absorption (28 days at 150° F.)—0.066%

Results for the hot and cold cycle test were approximately the same as for Example I.

Similar results are obtained by employing other mixtures of polystyrene with lesser amounts of the butadiene-styrene or butadiene-acrylonitrile copolymers mentioned above, or with the same amounts of other copolymers of butadiene-1,3 hydrocarbons with an equal or lesser amount of copolymerizable mono-ethylenic material.

The tensile strength of the molded compositions comprised predominately of the mixtures of this invention is 5,000 to 6,000 lb. per sq. in., and the ultimate elongation of the compositions is 1.5 to 2.0%. The molded products are also characterized by low water absorption. Battery containers and covers molded from such compositions are much superior to conventional containers and covers with respect to chemical inertness, lightness of weight, resistance to distortion at elevated temperature or during repeated temperature changes, and absence of residual strains in the molded article.

Although specific embodiments of our invention have been described herein, we do not intend to limit ourselves solely thereto but to include all the obvious variations and modifications within the scope of the appended claims.

We claim:

1. A molded battery container exhibiting a resistance of at least 100 cycles to the A. S. T. M. Hot and Cold Cycle test, an acid absorption less than 0.15% when a two-inch square specimen of the wall is immersed for 28 days in sulfuric acid (sp. gr. 1.30) at 150° F., a negligible bulge when filled with sulfuric acid (sp. gr. 1.01) and heated at 160° F. for three hours, and an impact strength (Izod) of at least 0.2 ft. lb. per inch of notch, said container comprising a homogeneous mixture of high molecular weight polystyrene with from one-tenth to one-third its weight of a rubbery copolymer containing from 50 to 90% by weight of a butadiene-1,3 hydrocarbon having from 4 to 8 carbon atoms, the remainder of said copolymer being combined copolymerizable material containing a single ethylenic linkage.

2. A molded battery container exhibiting a resistance of at least 100 cycles to the A. S. T. M. Hot and Cold Cycle test, an acid absorption less than 0.15% when a two-inch square specimen of the wall is immersed for 28 days in sulfuric acid (sp. gr. 1.30) at 150° F., a negligible bulge when filled with sulfuric acid (sp. gr. 1.01- and heated at 160° F. for three hours, and an impact strength (Izod) of at least 0.2 ft. lb. per inch of notch, said container comprising a homogeneous mixture of high molecular weight polystyrene with from one-tenth to one-third its weight of a rubbery copolymer containing from 50 to 80% by weight of a combined butadiene-1,3 hydrocarbon having from 4 to 8 carbon atoms, the remainder of said copolymer being combined styrene.

3. A molded battery container exhibiting a resistance of at least 100 cycles to the A. S. T. M. Hot and Cold Cycle test, an acid absorption less than 0.15% when a two-inch square specimen of the wall is immersed for 28 days in sulfuric acid (sp. gr. 1.30) at 150° F., a negligible bulge when filled with sulfuric acid (sp. gr. 1.01) and heated at 160° F. for three hours, and an impact strength (Izod) of at least 0.2 ft. lb. per inch of notch, said container comprising a homogeneous mixture of high molecular weight polystyrene with from one-tenth to one-third its weight of a rubbery copolymer containing from 50 to 80% by weight of a combined butadiene-1,3 hydrocarbon having from 4 to 8 carbon atoms, the remainder of said copolymer being combined acrylonitrile.

4. A molded battery container exhibiting a resistance of at least 100 cycles to the A. S. T. M. Hot and Cold Cycle test, an acid absorption less than 0.15% when a two-inch square specimen of the wall is immersed for 28 days in sulfuric acid (sp. gr. 1.30) at 150° F., a negligible bulge when filled with sulfuric acid (sp. gr. 1.01) and heated at 160° F. for three hours, and an impact strength (Izod) of at least 0.2 ft. lb. per inch of notch, said container comprising a homogeneous mixture of high molecular weight polystyrene with from one-tenth to one-third its weight of a rubbery copolymer consisting of 50 to 80% by weight of butadiene-1,3 and 20 to 50% of acrylonitrile.

5. A molded battery container exhibiting a resistance of at least 100 cycles to the A. S. T. M. Hot and Cold Cycle test, an acid absorption less than 0.15% when a two-inch square specimen of the wall is immersed for 28 days in sulfuric acid (sp. gr. 1.30) at 150° F., a negligible bulge when filled with sulfuric acid (sp. gr. 1.01) and heated at 160° F. for three hours, and an impact strength (Izod) of at least 0.2 ft. lb. per inch of notch, said container comprising a homogeneous mixture of high molecular weight polystyrene with from one-tenth to one-third its weight of a rubbery copolymer consisting of 50 to 80% by weight of butadiene-1,3 and 20 to 50% of styrene.

6. A molded battery container exhibiting a resistance of at least 100 cycles to the A. S. T. M. Hot and Cold Cycle test, an acid absorption less than 0.15% when a two-inch square specimen of the wall is immersed for 28 days in sulfuric acid (sp. gr. 1.30) at 150° F., a negligible bulge when filled with sulfuric acid (sp. gr. 1.01) and heated at 160° F., for three hours, and an impact strength (Izod) of at least 0.2 ft. lb. per inch of notch, said container comprising a homogeneous mixture of high molecular weight polystyrene with from one-tenth to one-third its weight of a rubbery copolymer consisting of equal parts by weight of combined butadiene-1,3 and styrene.

7. A molded battery container exhibiting a resistance of at least 100 cycles to the A. S. T. M. Hot and Cold Cycle test, an acid absorption less than 0.15% when a two-inch square specimen of the wall is immersed for 28 days in sulfuric acid (sp. gr. 1.30) at 150° F., a negligible bulge when filled with sulfuric acid (sp. gr. 1.01) and heated at 160° F. for three hours, and an impact strength (Izod) of at least 0.2 ft. lb. per inch of notch, said container comprising a homogeneous mixture of 82.5 parts by weight of high molecular weight polystyrene with 16.5 parts of a rubbery copolymer consisting of equal parts by weight of combined butadiene-1,3 and styrene.

CHARLES H. DITZ.
HAROLD A. HUSSEY.

REFERENCES CITED

The following references are of record in the file of this patent:

UNITED STATES PATENTS

| Number | Name | Date |
|---|---|---|
| 1,613,673 | Ostromislensky | Jan. 11, 1927 |
| 2,356,965 | Allison | Aug. 29, 1944 |
| 2,436,614 | Sparks et al. | Feb. 24, 1948 |

FOREIGN PATENTS

| Number | Country | Date |
|---|---|---|
| 845,954 | France | May 22, 1939 |
| 119,975 | Australia | May 17, 1945 |
| 577,860 | Great Britain | June 4, 1946 |
| 593,072 | Great Britain | Oct. 8, 1947 |

OTHER REFERENCES

India Rubber World, March 1944, page 577.
Modern Plastics catalog, 1945, pages 178–181.
Winkelmann, India Rubber World, March 1946, pages 799 and 801.
Kolthoff et al., Rubber chem. and Tech., April 1947, pages 546 to 555.